(12) United States Patent
Perry et al.

(10) Patent No.: US 8,404,398 B2
(45) Date of Patent: Mar. 26, 2013

(54) HERMETIC HIGH TEMPERATURE DIELECTRIC WITH GROOVE AND THERMAL EXPANSION COMPENSATOR

(75) Inventors: Martin Perry, Sunnyvale, CA (US); Michael Petrucha, Santa Clara, CA (US); Andy Ta, San Jose, CA (US); Brandon Snow, Palo Alto, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 825 days.

(21) Appl. No.: 12/461,413

(22) Filed: Aug. 11, 2009

(65) Prior Publication Data

US 2010/0040934 A1    Feb. 18, 2010

Related U.S. Application Data

(60) Provisional application No. 61/136,091, filed on Aug. 12, 2008.

(51) Int. Cl.
  *H01M 2/08* (2006.01)
  *H01M 2/40* (2006.01)
(52) U.S. Cl. ........ 429/510; 429/509; 429/508; 429/507; 429/459; 429/460; 429/461; 429/456; 429/455
(58) Field of Classification Search .................. 429/510, 429/509, 508, 507, 459, 460, 461, 456, 455
  See application file for complete search history.

(56) References Cited

U.S. PATENT DOCUMENTS

| | | | |
|---|---|---|---|
| 3,284,118 A | | 11/1966 | Kessler, Jr. |
| 3,746,374 A | * | 7/1973 | Sedgwick et al. ............ 285/187 |
| 2004/0202914 A1 | | 10/2004 | Sridhar et al. |
| 2005/0164051 A1 | | 7/2005 | Venkataraman et al. |
| 2006/0204827 A1 | | 9/2006 | Hickey et al. |
| 2007/0196704 A1 | | 8/2007 | Valensa et al. |
| 2007/0269693 A1 | | 11/2007 | Perry |

FOREIGN PATENT DOCUMENTS

| | | |
|---|---|---|
| JP | 61-67565 | 4/1986 |
| JP | 2-119059 | 5/1990 |

OTHER PUBLICATIONS

McDonald, Program, "Chattanooga Fuel Cell Demonstration Project", US Department of Energy Hydrogen Program, www.hydrogen.energy.gov/pdfs/progress05/viii_d_3_mcdonald.pdf, pp. 1209-1214.
Ferguson et al., "Chattanooga Fuel Cell Demonstration Project", US Department of Energy Hydrogen Program, 2005 Annual Merit Review Meeting, May 23-26, 2005, http://www.hydrogen.energy.gov/pdfs/review05/tvp_2_ferguson.pdf, 20 pgs.

* cited by examiner

*Primary Examiner* — Helen O Conley
(74) *Attorney, Agent, or Firm* — The Marbury Law Group PLLC

(57) ABSTRACT

According to an embodiment, a gas delivery device for a fuel cell system includes a hollow ceramic element comprising a dielectric material having at least one groove in one end face of the ceramic element and a first metal tube, wherein an end of the first metal tube is inserted into the groove of the hollow ceramic element. According to an embodiment, a fuel cell system includes a fuel cell stack or column, a gas delivery line fluidly connected to the stack or column, and a coefficient of thermal expansion compensator/isolator located in the gas delivery line, where the coefficient of thermal expansion compensator/isolator includes a hollow ceramic element made of a dielectric material having at least one groove in one end face of the ceramic element, a first metal tube, where an end of the first metal tube is inserted into the groove of the hollow ceramic element, and a hollow flexible element which compensates for differences in coefficients of thermal expansion between components of the fuel cell system.

9 Claims, 7 Drawing Sheets

HERMETIC HIGH TEMPERATURE DIELECTRIC WITH GROOVE AND THERMAL EXPANSION COMPENSATOR

CROSS-REFERENCE TO RELATED PATENT APPLICATION

The present application claims benefit of U.S. provisional application Ser. No. 61/136,091, filed Aug. 12, 2008, which is incorporated herein by reference in its entirety.

BACKGROUND

The present invention relates to a gas delivery device or conduit for a fuel cell stack.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation.

In a high temperature fuel cell system such as a solid oxide fuel cell (SOFC) system, an oxidizing flow is passed through the cathode side of the fuel cell while a fuel flow is passed through the anode side of the fuel cell. The oxidizing flow is typically air, while the fuel flow is typically a hydrogen-rich gas created by reforming a hydrocarbon fuel source. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

Fuel cell stacks may be either internally or externally manifolded for fuel and air. In internally manifolded stacks, the fuel and air is distributed to each cell using risers contained within the stack. In other words, the gas flows through riser openings or holes in the supporting layer of each cell, such as the electrolyte layer, for example. In externally manifolded stacks, the stack is open on the fuel and air inlet and outlet sides, and the fuel and air are introduced and collected independently of the stack hardware. For example, the inlet and outlet fuel and air flow in separate channels between the stack and the manifold housing in which the stack is located.

SUMMARY

According to an embodiment, a gas delivery device for a fuel cell system includes a hollow ceramic element comprising a dielectric material having at least one groove in one end face of the ceramic element, and a first metal tube, wherein an end of the first metal tube is inserted into the groove of the hollow ceramic element.

According to an embodiment, a fuel cell system includes a fuel cell stack or column, a gas delivery line fluidly connected to the stack or column, and a coefficient of thermal expansion compensator/isolator located in the gas delivery line, wherein the coefficient of thermal expansion compensator/isolator comprises a hollow ceramic element comprising a dielectric material having at least one groove in one end face of the ceramic element, a first metal tube, wherein an end of the first metal tube is inserted into the groove of the hollow ceramic element, and a hollow flexible element which compensates for differences in coefficients of thermal expansion between components of the fuel cell system.

According to another embodiment, a gas delivery device for a fuel cell system includes a hollow ceramic element comprising a dielectric material and a first metal tube, wherein an end face of the ceramic element is connected to an end of the first metal tube by a butt joint.

It is to be understood that both the foregoing general description and the following detailed description are exemplary and explanatory only, and are not restrictive of the invention as claimed.

BRIEF DESCRIPTION OF THE DRAWING

These and other features, aspects, and advantages of the present invention will become apparent from the following description, appended claims, and the accompanying exemplary embodiments shown in the drawing, which is briefly described below.

DETAILED DESCRIPTION

Embodiments of the invention will be described below with reference to the drawings.

In the fabrication of a fuel cell stack or column, or series of fuel cell stacks or columns, the delivery of gas is an important consideration. A gas delivery line for a fuel cell stack or column contains a dielectric insert or spacer in order to isolate the balance of the delivery plumbing from the metallic components within the fuel cell stack or column, while providing a hermetic seal for the delivered gas. Additionally, the line contains a flexible element to compensate for different coefficients of thermal expansion between various plumbing components so that stresses exerted upon the fuel cell stack or column are minimized. The insert and flexible elements are hollow to form a conduit which allows gas to pass through them. The gas delivery line can be fluidly connected to a fuel cell stack or column and/or the balance of gas delivery plumbing. Fluidly connected means permitting fluid to flow from one point to another, either directly or indirectly.

According to an embodiment, the gas delivery device beneficially allows the use of metallic fuel manifold plates by electrically isolating the fuel cell stack or column from the balance of the gas delivery plumbing. The metallic manifold plates beneficially provide continuous electrical conductivity within a stack or column, thereby reducing the potential for degradation of resistance connections. Preferably, the gas delivery device provides electrical isolation of the fuel cell stack or column to a high degree by including the ceramic element.

The gas delivery device reduces the stress on tubing joints by compensating for stresses that arise from differences in coefficients of thermal expansion between various plumbing components. Such a gas delivery device is described by U.S. application Ser. No. 11/436,537, filed on May 19, 2006, which is hereby incorporated by reference in its entirety.

Figure 1:
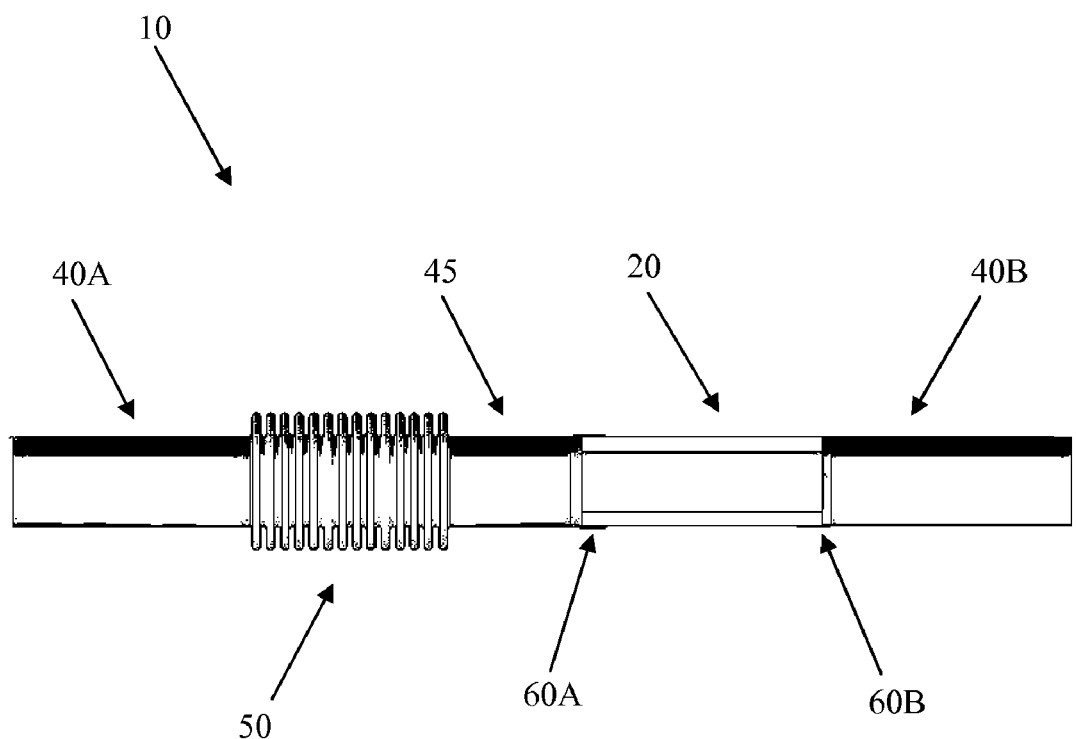
FIG. 1 shows a partial sectional view of a gas delivery device, with a ceramic element in partial section.

FIG. 1 shows a sectional view of an exemplary gas delivery device 10. According to an embodiment, the gas delivery device 10 includes a ceramic element 20, metal tubes 40A, 40B, and a flexible metal expansion element, such as a bellows 50. The ceramic element 20 is shown in cross section in FIG. 1.

The ceramic element 20 functions as a dielectric element that electrically insulates the fuel cell stack or column from the balance of the gas delivery plumbing. The ceramic element 20 is made from a ceramic material with dielectric properties such that the ceramic element 20 is electrically insulating under operating conditions. For example the ceramic element 20 is electrically insulating while gas is flowing through and contacting the ceramic element 20 and while the ceramic element 20 is exposed to operating temperatures of the fuel cell system.

According to an embodiment, the ceramic element 20 can be made of alumina or other ceramic materials possessing high dielectric strength at operating temperatures of the fuel cell system. For example, the ceramic element 20 can be made of high purity alumina.

The metal tubes 40A, 40B can be used to form metallic joints with other fuel cell system parts, such as, for example, gas delivery plumbing, the fuel cell stack or column (such as fuel inlets of one or more fuel manifold plates of the stack), and/or a fuel cell hot box. The metal tubes 40A, 40B may be joined to other fuel cell parts through mechanical seals, welds, brazes, and other joining methods known in the art.

The bellows 50 acts to compensate for differences in coefficients of thermal expansion between fuel cell components. The bellows 50 acts to minimize stresses exerted upon the fuel cell stack or column. For example the bellows 50 can act to minimize stress upon fuel cell stack or column components, such as fuel manifold plates, such as the plates described in U.S. application Ser. No. 11/276,717 filed on Mar. 10, 2006, which is incorporated by reference in its entirety.

According to an embodiment, the bellows 50 can act to minimize stresses exerted upon the fuel cell stack or column by deforming in preference to other components of the gas delivery device 10 and other fuel cell components. In this way, the bellows 50 deforms to absorb stress rather than transmitting stress to other portions of the gas delivery device 10 or other parts of a fuel cell system. The deformation of the bellows 50 can prevent the ceramic element 20 from being excessively stressed, which can cause the ceramic element 20 to crack and break. For example, the bellows 50 can deform in axial and/or radial directions in order to minimize stress upon other gas delivery device 10 components and fuel cell system parts, including the fuel cell stack or column.

According to an embodiment, the bellows 50 and/or metal tubes 40A, 40B can be made of metal alloys that can withstand the operating temperatures of the fuel cell system and have minimal reactivity with gas flowing through the gas delivery device. For example, the bellows 50 and/or metal tubes 40A, 40B can be made of stainless steels, such as 321 stainless or A286 steels, or they made of high temperature alloys, such as Ni—Cr, Ni—Cr—W, Ni—Cr—Mo, Fe—Ni, Ni—Co, Fe—Co, or Fe—Ni—Co alloys. For example, exemplary alloys include Inconel® 600 series alloys, such as 600, 601, 602, or 625 alloys; or Haynes® 200, 500, or 600 series alloys, such as 230, 556, or 617 alloys.

The materials for the ceramic element 20 and the metal tubes 40A, 40B can be selected in order to provide improved integrity for joint between the ceramic element 20 and the metal tubes 40A, 40B. According to an embodiment, the materials of the ceramic element 20 and the metal tubes 40A, 40B are selected so that the yield strengths of the materials for the ceramic element 20 and the metal tubes 40A, 40B are compatible with one another. For example, the metal tubes 40A, 40B can be made of 321 stainless steel and the ceramic element 20 can be made of alumina with 99.8% purity. In another example, the metal tubes 40A, 40B can be made of Inconel® alloy 600 and the ceramic element 20 can be made of alumina with 99.8% purity. In another example, the metal tubes 40A, 40B can be made of Inconel® alloy 625 and the ceramic element 20 can be made of alumina with 99.8% purity.

The joints between the ceramic element 20 and the metal tubes 40A, 40B can be mechanically designed to provide improved integrity. According to an embodiment, the metal tubes 40A, 40B can be provided with lips 60A, 60B at a distal end of the metal tubes 40A, 40B so that the lips 60A, 60B fit over the outside surface of the ceramic element 20. With this arrangement, the ceramic element 20 is seated within the lips 60A, 60B to provide further integrity to the joint between the ceramic element 20 and the metal tubes 40A, 40B. The wall thickness of the lips 60A, 60B can be, for example, 0.002" (inches) to 0.015" (inches), or more preferably 0.004" to 0.012", or more preferably 0.006" to 0.010". If desired, section 45 of tube 40A, which is located between ceramic element 20 and bellows 50, can have the same thickness as the lip 60A.

The wall thickness of the ceramic element 20 and the wall thickness of the metal tubes 40A, 40B can be selected to provide joint integrity, according to an embodiment. The metal tubes 40A, 40B can be thin-walled where the metal tubes 40A, 40B join the ceramic element 20. According to an embodiment, the wall thickness of the ceramic element 20 can be greater than the wall thickness of the metal tubes 40A, 40B. The wall thickness of the ceramic element 20 can be, for example, 0.020" to 0.100", or more preferably 0.025" to 0.080", or more preferably 0.030" to 0.060", or more preferably 0.035" to 0.050".

Figure 2:
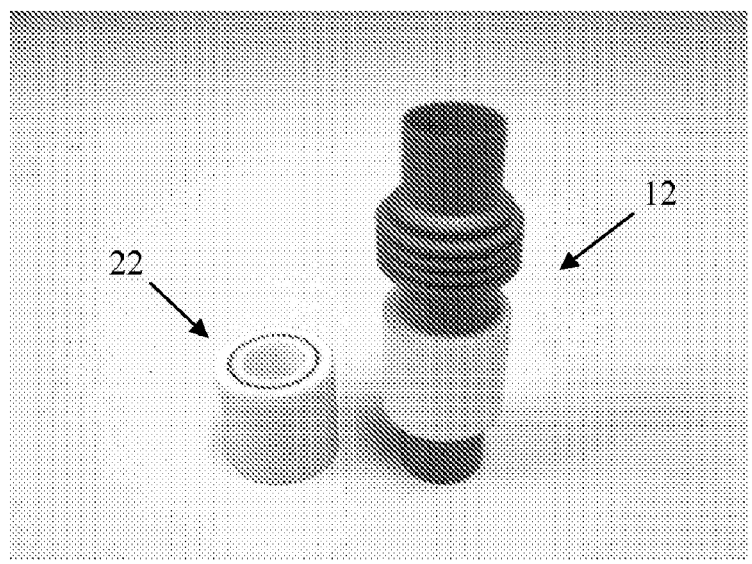
FIG. 2 shows a perspective view of a ceramic element and a gas delivery device.
Figure 3:
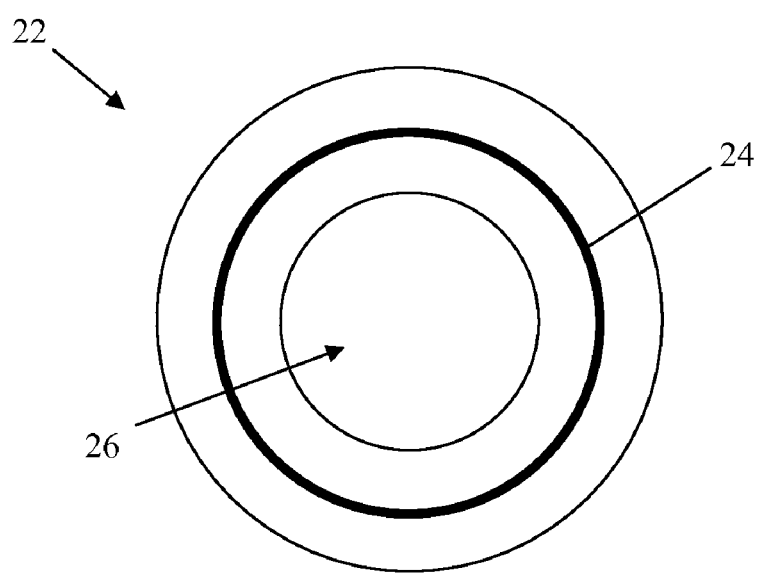
FIG. 3 shows a cross-sectional view of a ceramic element.

FIG. 2 shows a ceramic element 22 and a gas delivery device 12, according to another embodiment. As shown in FIG. 3, which shows a cross-sectional view of the ceramic element 22, the ceramic element 22 can include a groove 24 and a passage 26 formed by the hollow interior of the ceramic element 22. The ceramic element 22 can be configured to include a groove 24 in each end face in relation to the longitudinal axis or flow direction of the ceramic element. The groove 24 can be formed in the ceramic element 22 by, for example, machining or other methods used in the art.

According to this embodiment, the wall thickness of the ceramic element 22 can be greater than the wall thickness of the metal tubes 40A, 40B. The wall thickness of the ceramic element 22 can be, for example, 0.100" to 0.500", or more preferably 0.150" to 0.400", or more preferably 0.200" to 0.300", or more preferably 0.250" to 0.275". The ceramic element can have an outer diameter of 2.000" or more, or more preferably 1.000" or more, or more preferably 1.000" to 1.050". The groove 24 can have an inner diameter of 0.700" to 0.800" and an outer diameter of 0.725" to 0.850", or more preferably an inner diameter of 0.725" to 0.775" and an outer diameter of 0.735" to 0.810", or more preferably an inner diameter of 0.747" to 0.752" and an outer diameter of 0.783" to 0.792". The groove 24 can have a depth of up to 0.50", or more preferably a depth of up to 0.40", or more preferably a depth of up to 0.30", or more preferably a depth of 0.25".

Figure 4:
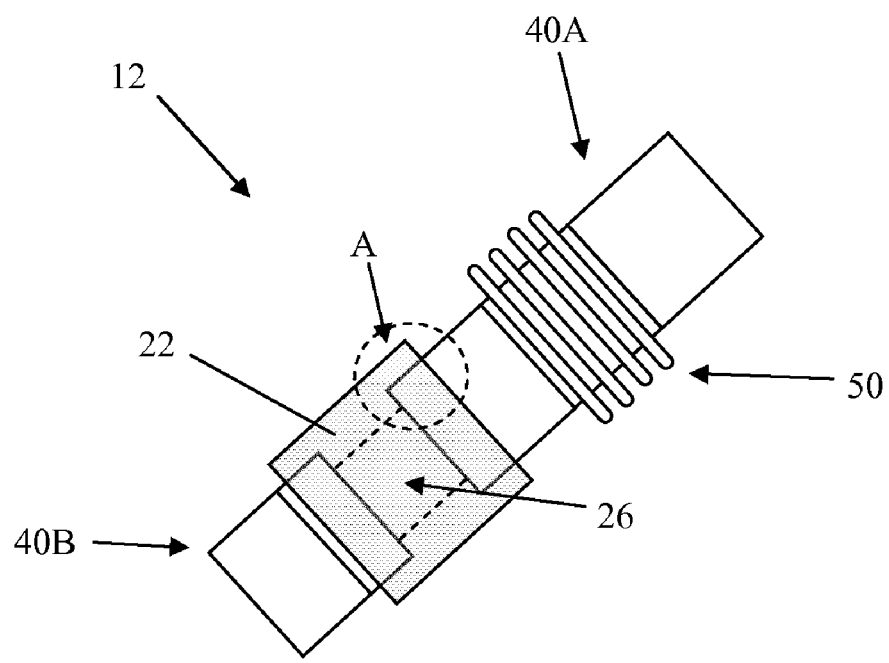
FIG. 4 shows a partial sectional view of a gas delivery device, with a ceramic element in partial section.

As shown in FIG. 4, a gas delivery device 12 can include the ceramic element 22, a metal tube 40A, which includes a bellows 50, and a metal tube 40B. The grooves 24 on either side of the ceramic element 22 can be configured to receive an end of a respective metal tube 40A, 40B that is inserted into the respective groove 24, as shown in the example of FIG. 4, where the ceramic element 22 is shown in shadow. By providing a groove 24 in each end of the ceramic element 22 for an end of a respective metal tube 40A, 40B, the ceramic element 22 and the metal tubes 40A, 40B can be joined to one another without fitting the metal tubes 40A, 40B over the exterior of the ceramic element 22 or without the use of lips 60A, 60B to fit over the outside surface of the ceramic element 22. Thus, the ceramic element 22 and the metal tubes 40A, 40B may be provided and joined to one another without an additional feature, e.g., lips 60A, 60B, which can advantageously improve the yield of the manufacturing process for the gas delivery device 12.

Figure 5:
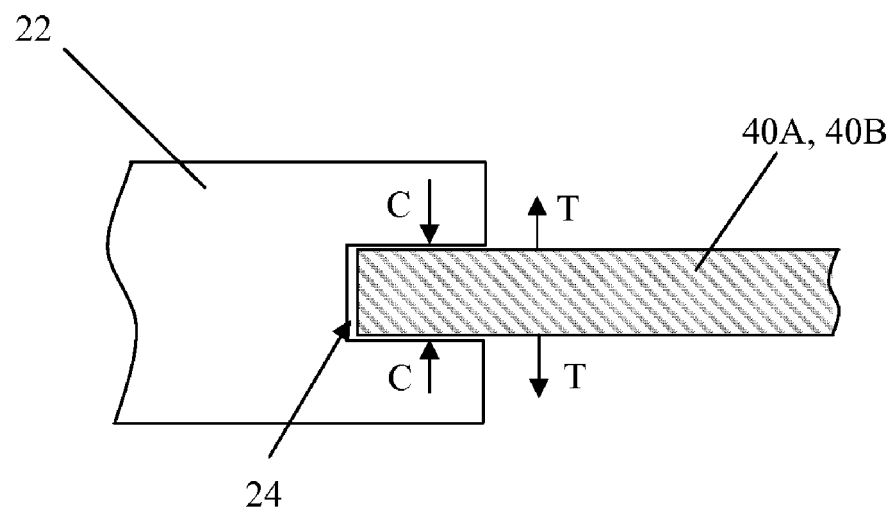
FIG. 5 shows an enlarged cross-sectional view of area A of FIG. 4.

FIG. 5 shows an enlarged cross-sectional view of area A of FIG. 4. Joints formed between metal tubes 40A, 40B and the ceramic element 22 can have the configuration shown in the example of FIG. 5. As shown in the example of FIG. 5, an end of a metal tube 40A, 40B can be inserted into a groove 24 formed in an end face of the ceramic element 22 so that the end of the metal tube 40A, 40B is nested within the groove 24 and surrounded by the body of the ceramic element 22 on both sides. The end face comprises a surface extending between an inner wall and an outer wall of the hollow ceramic element 22. The groove 24 is centered on the end face between the inner wall and the outer wall of the hollow ceramic element 22. Once the end of the metal tube 40A, 40B is inserted into the groove 24, the metal tube 40A, 40B and the ceramic element 22 can be joined to one another, such as by, for example, brazing, as described herein. Therefore, the groove 24 can also include brazing material (not shown in FIG. 5).

Because the materials of the metal tube 40A, 40B and the ceramic element 22 have different coefficients of thermal expansion, the metal tubes 40A, 40B will tend to expand at higher amounts than the ceramic element 22 when the gas delivery device 12 is exposed to higher temperatures. Because of this, the metal tubes 40A, 40B will tend to expand in relation to the ceramic element 22, which is expanding at a lower amount. For example, when a metal tube is fitted over the exterior of a ceramic element and joined to the ceramic element, the expansion of the metal tube at higher temperatures will create tensile forces in relation to the ceramic element which must be absorbed by the joint between the metal tube and the ceramic element.

By inserting a metal tube 40A, 40B into the groove 24 of a ceramic element 22, the tensile forces, as demonstrated by arrows T in the example of FIG. 5, can be counteracted. For example, by inserting the end of the metal tube 40A, 40B into the groove 24 and joining the metal tube 40A, 40B to the ceramic element 22, the tensile forces T created when the metal tube 40A, 40B expands at relatively high temperatures can be counteracted by the body of the ceramic element 22. For example, the body of the ceramic element 22 that forms the groove 24 can surround the end of the metal tube 40A, 40B so that the ceramic element 22 acts to constrain the metal tube 40A, 40B when the metal tube 40A, 40B expands at relatively high temperatures. Because the metal tube 40A, 40B is constrained in this way, the ceramic element 22 can thus create compressive forces, as demonstrated by arrows C in the example of FIG. 5, that act upon the metal tube 40A, 40B and counteract the tensile forces T created when the metal tube 40A, 40B expands at a different rate than the ceramic element 22. Thus, the joint between the ceramic element 22 and the metal tube 40A, 40B can advantageously be configured to counteract and/or absorb forces created when the gas delivery device 12 is exposed to relatively high temperatures.

Figure 6:
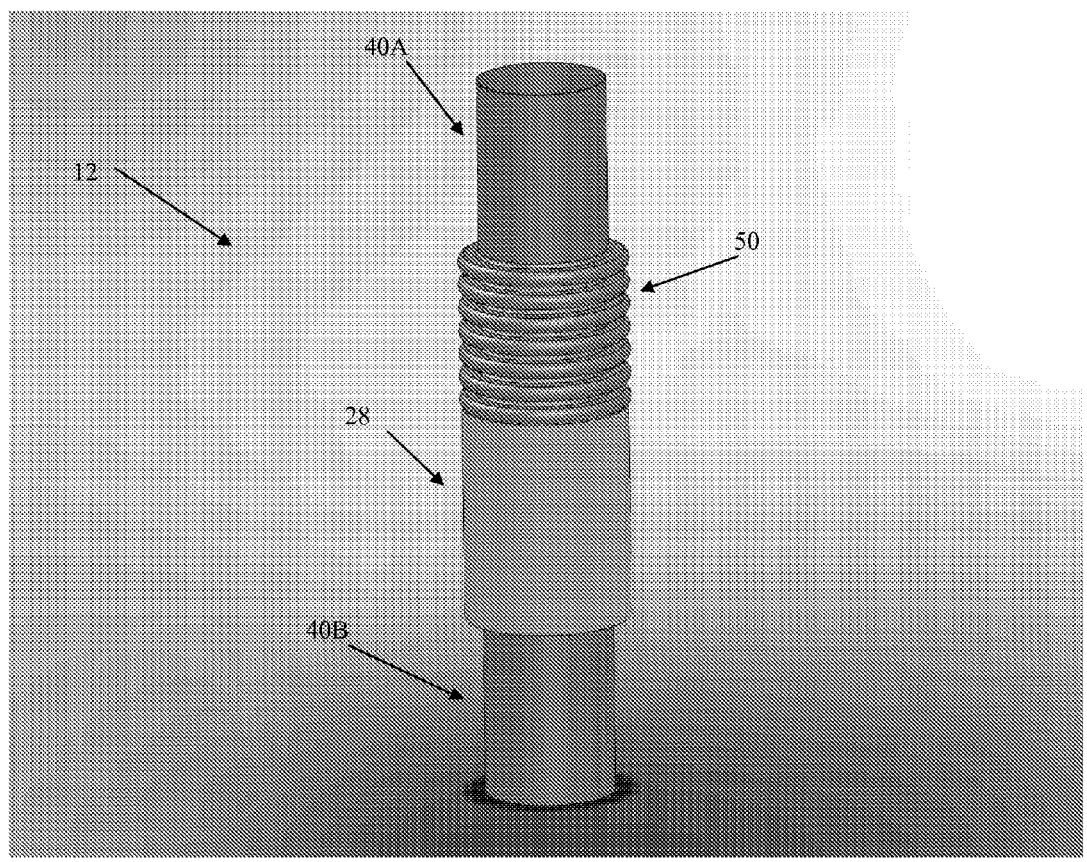
FIG. 6 shows a perspective view of a gas delivery device of another embodiment.
Figure 7:
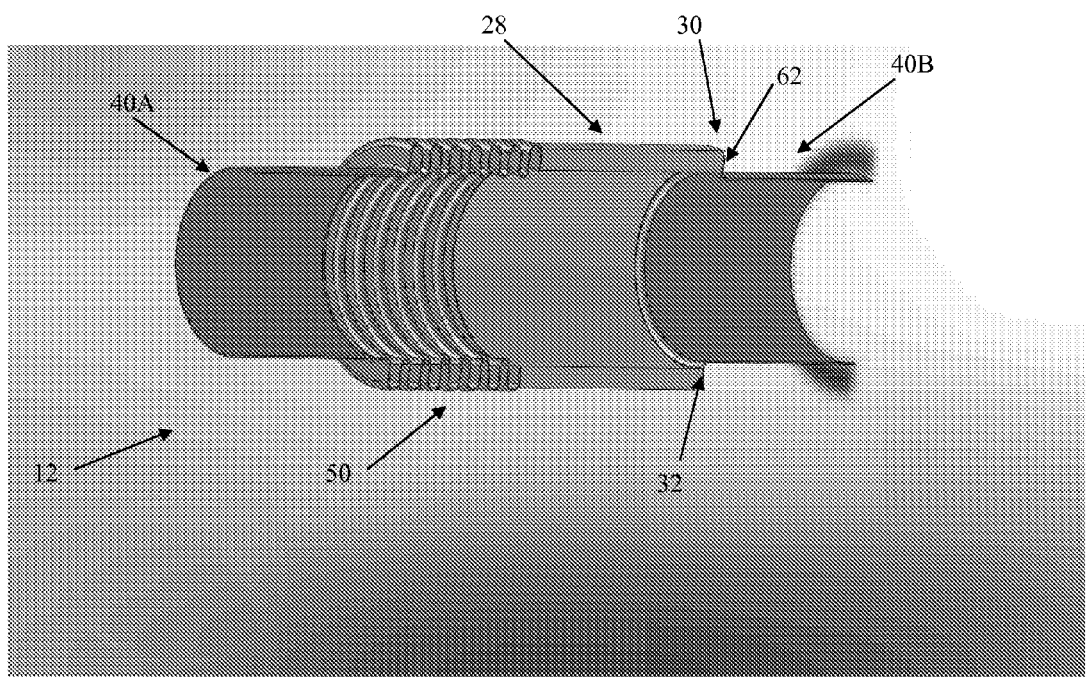
FIG. 7 shows a cross-sectional view of a gas delivery device of FIG. 6.

FIG. 6 shows a gas delivery device 12 having a ceramic element 28, according to another embodiment. As shown in FIG. 7, which shows a full sectional view of the gas delivery device 12, the ceramic element 28 can be connected to an end of metal tubes 40A, 40B by a butt joint 30. The butt joint 30 is formed by abutting an end face in relation to the longitudinal axis of and/or gas flow direction in the cylindrical ceramic element 28 with an end face in relation to the longitudinal axis of and/or gas flow direction in the end of the cylindrical metal tubes 40A, 40B. Optionally, the end of the metal tubes 40A, 40B can also be formed into a flange 62. Once the end face of the ceramic element 28 abuts the flange 62, the metal tube 40A, 40B and the ceramic element 28 can be further joined to one another, such as by, for example brazing, as described herein. Therefore, the butt joint 30 can also include a brazing material 32 located between the ceramic element 28 and the respective metal tube 40A, 40B.

Figure 8:
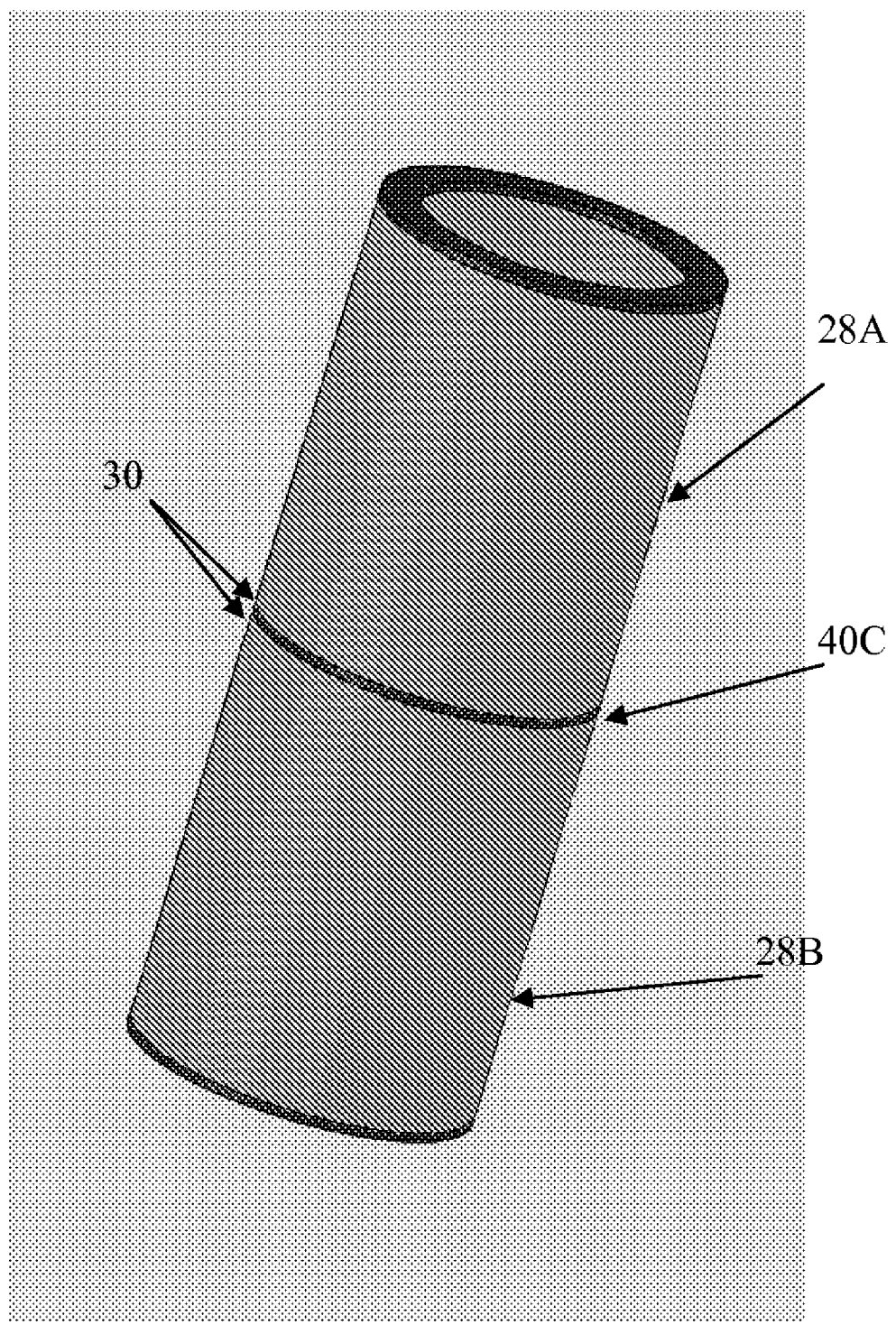
FIG. 8 shows a perspective view of two joined ceramic elements.
Figure 9:
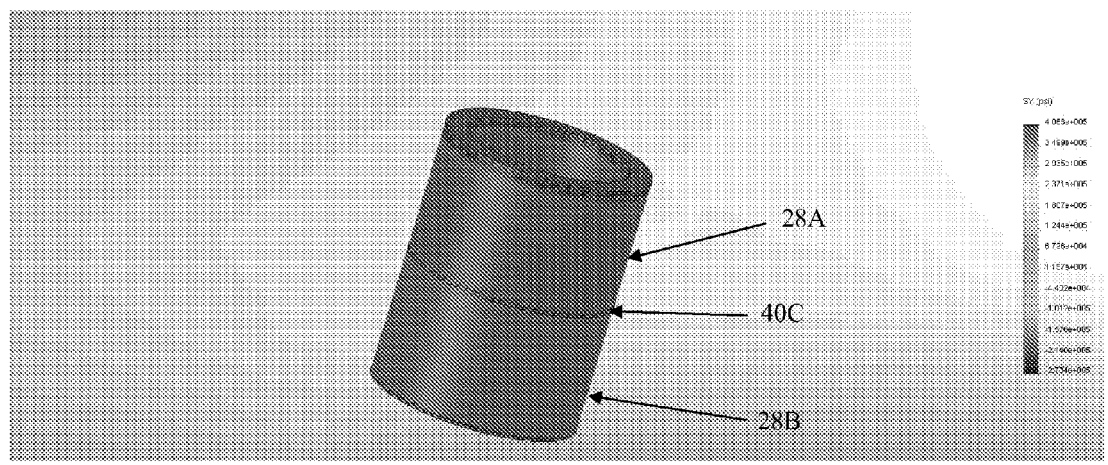
FIG. 9 shows a perspective view of two joined ceramic elements.

FIG. 8 shows a perspective view of a test structure which includes two ceramic elements 28A, 28B separated by an Inconel ring 40C. The ring 40C is joined to the two ceramic elements 28A, 28B by butt joints 30 with a brazing material located between the ring 40C and each ceramic element 28A, 28B. FIG. 9 shows results of a thermal stress test simulation using Finite Element Analysis on the test structure of FIG. 8. FIG. 9 shows that the thermal stresses within the assembly of the two ceramic elements 28A, 28B joined to the metal ring 40C by the butt joints 30 with brazing material are well within allowed limits and that the use of the butt joints 30 does not cause undue thermal stress concentration to be placed on the ceramic elements 28A, 28B.

A test was performed on an exemplary gas delivery device 12 of FIGS. 2-5 to test its integrity after thermal cycling. The gas delivery device 12 was heated in an air furnace by ramping the temperature to 900° C. at a rate of 5° C./min, was soaked at 900° C. for one hour, was cooled to 20° C. at a rate of to 5° C./min, and this cycle was repeating nine times. Afterwards, the gas delivery device 12 was placed in a chamber and the surrounding pressure was reduced to $10^{-8}$ torr to expose the gas delivery device 12 to vacuum while the device 12 contained gas in its interior to determine if the device 12 was leaking. Subsequently, the gas delivery device 12 was heated in an air furnace to 950° C. at a rate of 5° C./min, soaked at 950° C. for 100 hours, and cooled to 20° C. at a rate of 5° C./min. Finally, the gas delivery device 12 was again leak tested under vacuum, using the method described above. The leak tests showed that the seals of the gas delivery device 12 did not exhibit any significant leaks after the gas delivery device 12 was exposed to these thermal cycles.

According to an embodiment, the ceramic element 20, 22, 28 and the metal tubes 40A, 40B can be matched by selecting a material and wall thickness for the metal tube 40A, 40B that has a compatible yield strength for matching with the wall thickness of the ceramic element 20, 22, 28. Preferably, the yield strength of the material for the tubes 40A, 40B is ±20% of the yield strength of the material for the ceramic element 20, 22, 28.

The ceramic element 20, 22, 28 is joined to metal tubes 40A, 40B to form a sealed joint between the ceramic element 20, 22, 28 and the metal tubes 40A, 40B. For example, the ceramic element 20, 22, 28 can be brazed to the metal tubes 40A, 40B to form a sealed joint between the ceramic element 20, 22, 28 and the metal tubes 40A, 40B. The braze material for joining the ceramic element 20, 22, 28 to the metal tubes 40A, 40B is selected for compatibility with the ceramic material of the ceramic element 20, 22, 28 and the metal that the tubes 40A, 40B are made from.

According to an embodiment, the ceramic element 20, 22, 28 can be directly joined to the bellows 50 so that an intermediate portion 45 of metal tube 40A, 40B between the bellows 50 and the ceramic element 20, 22, 28 is not necessary. For example, the ceramic element 20, 22, 28 may be brazed directly to the bellows 50. The same principles of joining the ceramic element 20, 22, 28 to the metal tubes 40A, 40B apply to embodiments where the ceramic element 20, 22, 28 is directly joined to the bellows 50.

According to an embodiment, the bellows 50 can be directly joined to other fuel cell parts without the use of a metal tube 40A, 40B. For example, the bellows 50 can be joined directly to gas delivery plumbing, the fuel cell stack or column, and/or a fuel cell hot box. The bellows 50 may be joined to other fuel cell parts through mechanical seals, welds, brazes, and other joining methods known in the art.

In FIG. 1, the fuel cell stack (not shown) would be located on the left side and the gas delivery plumbing or vessel (not shown), would be located on the right side. The bellows 50 can be arranged between the ceramic element 20, 22, 28 and the fuel cell stack or column, as shown in FIG. 1. According to another embodiment, the ceramic element 20, 22, 28 can be arranged between the bellows 50 and the fuel cell stack or column.

According to an embodiment, a second bellows 50 can be provided in the gas delivery device 10, 12 so that a bellows is provided on each side of the ceramic element 20, 22, 28. Metal tubes 40A, 40B can be placed between each bellows 50 and the ceramic element 20, 22, 28, or the ceramic element 20, 22, 28 may be directly joined to one of, or each bellows 50.

According to an embodiment, the gas delivery device can be located at any point within the gas delivery plumbing of a fuel cell system. According to a further embodiment, the gas delivery device can be located at the interface of the gas delivery plumbing with the fuel cell stack so that the gas delivery device forms a joint between the fuel cell stack and the gas delivery plumbing. According to another further embodiment, the gas delivery device can be located outside of a hot box that contains the fuel cell stack, so that the gas delivery device forms a joint between the hot box and gas delivery plumbing that supplies gas to the fuel cell components inside of the hot box. According to another further embodiment, the gas delivery device can be located inside of the hot box so that the gas delivery device forms a joint with the gas delivery plumbing inside of the hot box.

The gas delivery device may be located in the fuel line which provides fuel to one or more fuel cell stacks or columns, for example in the fuel line of the system described in U.S. Published Application 2007/0196704 A1, published on Aug. 23, 2007, and incorporated herein by reference in its entirety. Likewise, the gas delivery device may also be located in the fuel exhaust line, oxidizer inlet line, and/or oxidizer exhaust line. The fuel cell stacks may comprise any suitable fuel cells, such as solid oxide, molten carbonate, or other high temperature fuel cells or PEM or other low temperature fuel cells.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments.

What is claimed is:

1. A fuel cell system, comprising:
   a fuel cell stack or column;
   a gas delivery line fluidly connected to the stack or column; and
   a coefficient of thermal expansion compensator/isolator located in the gas delivery line, wherein the coefficient of thermal expansion compensator/isolator comprises:
      a hollow ceramic element comprising a dielectric material having at least one groove in one end face of the ceramic element;
      a first metal tube, wherein an end of the first metal tube is inserted into the groove of the hollow ceramic element such that the end of the first metal tube is nested within the groove and surrounded by the body of the ceramic element; and
      a hollow flexible element which compensates for differences in coefficients of thermal expansion between components of the fuel cell system.

2. The fuel cell system of claim 1, wherein the coefficient of thermal expansion compensator/isolator further comprises:
   a second metal tube connected to the ceramic element; and
   a third metal tube connected to the flexible element;
   wherein:
      the ceramic element is located between the first metal tube and the second metal tube and an end of the second metal tube is inserted into a groove in another end face of the ceramic element; and
      the flexible element is located between the second metal tube and third metal tube.

3. The fuel cell system of claim 2, wherein:
   the second metal tube is fluidly connected to a gas source;
   the third tube is fluidly connected to a fuel cell stack or column; and
   the flexible element comprises a bellows.

4. The fuel cell system of claim 1, wherein the ceramic element surrounds the end of the first metal tube inserted into the groove of the ceramic element so that the ceramic element constrains the end of the first metal tube.

5. The fuel cell system of claim 1, wherein the ceramic element comprises high purity alumina and the first metal tube comprises stainless steel.

6. The fuel cell system of claim 1, wherein the ceramic element comprises high purity alumina and the first metal tube comprises a Ni—Cr—W alloy or a Ni—Fe alloy.

7. The fuel cell system of claim 1, wherein the end of the first metal tube is nested within the groove and surrounded by the body of the ceramic element on both sides.

8. The fuel cell system of claim 1, wherein the one end face of the ceramic element comprises a surface extending between an inner wall and an outer wall of the ceramic element, and the at least one groove in the one end face is centered between the inner wall and the outer wall of the ceramic element.

9. The fuel cell system of claim 1, wherein the one end face of the ceramic element comprises an end face in relation to a longitudinal axis of the ceramic element.

* * * * *